United States Patent
Kanada et al.

(10) Patent No.: US 10,493,849 B2
(45) Date of Patent: Dec. 3, 2019

(54) BATTERY SYSTEM AND ESTIMATION SYSTEM

(71) Applicant: TOYOTA JIDOSHA KABUSHIKI KAISHA, Toyota-shi, Aichi-ken (JP)

(72) Inventors: Ryo Kanada, Toyota (JP); Takanori Soejima, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 151 days.

(21) Appl. No.: 15/877,772

(22) Filed: Jan. 23, 2018

(65) Prior Publication Data
US 2018/0208062 A1 Jul. 26, 2018

(30) Foreign Application Priority Data
Jan. 26, 2017 (JP) .................. 2017-012057

(51) Int. Cl.
*B60L 3/00* (2019.01)
*B60L 58/12* (2019.01)
*B60L 58/25* (2019.01)

(52) U.S. Cl.
CPC ............. *B60L 3/0046* (2013.01); *B60L 58/12* (2019.02); *B60L 58/25* (2019.02); *B60L 2240/36* (2013.01); *B60L 2240/70* (2013.01); *Y02T 10/7005* (2013.01); *Y02T 10/705* (2013.01); *Y02T 10/7044* (2013.01); *Y02T 10/7291* (2013.01); *Y02T 90/16* (2013.01)

(58) Field of Classification Search
None
See application file for complete search history.

(56) References Cited

U.S. PATENT DOCUMENTS

| | | |
|---|---|---|
| 2011/0121785 A1 | 5/2011 | Iida et al. |
| 2011/0185196 A1* | 7/2011 | Asano ................. B60L 11/1809 713/300 |
| 2013/0289821 A1* | 10/2013 | Nakagawa ............. B60L 58/12 701/31.4 |
| 2014/0222358 A1 | 8/2014 | Morita et al. |
| 2016/0201932 A1 | 7/2016 | Endo et al. |

(Continued)

FOREIGN PATENT DOCUMENTS

| | | |
|---|---|---|
| JP | 2007-57434 A | 3/2007 |
| JP | 2010-35392 A | 2/2010 |
| JP | 2010-195292 A | 9/2010 |

(Continued)

*Primary Examiner* — Lail A Kleinman
(74) *Attorney, Agent, or Firm* — Sughrue Mion, PLLC

(57) ABSTRACT

A battery system is configured to be mounted on a vehicle. The battery system includes a secondary battery, a detection device, and an electronic control unit. The electronic control unit is configured to perform communication with an external device that accumulates temperature history data of other vehicle, and is configured to acquire, when the battery temperature of the temperature history data of the vehicle contains an abnormal value, the temperature history data of the other vehicle within a period in which the battery temperature of the temperature history data of the vehicle contains the abnormal value, from the external device, and execute correction of the abnormal value of the battery temperature based on the temperature history data acquired from the external device.

7 Claims, 10 Drawing Sheets

(56) References Cited

U.S. PATENT DOCUMENTS

2016/0375790 A1 12/2016 Komiyama
2019/0004118 A1* 1/2019 Eichelberger ...... G01R 31/3651

FOREIGN PATENT DOCUMENTS

| JP | 2012-185122 A | 9/2012 |
| JP | 2013-118757 A | 6/2013 |
| JP | 2014-54083 A | 3/2014 |
| JP | 2014-66542 A | 4/2014 |
| JP | 2014-149280 A | 8/2014 |
| JP | 2015-48957 A | 3/2015 |
| JP | 2015-50819 A | 3/2015 |
| JP | 2017-009540 A | 1/2017 |
| WO | 2016/071941 A1 | 5/2016 |

* cited by examiner

| VEHICLE ID | TEMPERATURE $Tb_1$ | TIME $t_1$ | POSITION $P_1$ | — $d_1$ |
| VEHICLE ID | TEMPERATURE $Tb_2$ | TIME $t_2$ | POSITION $P_2$ | — $d_2$ |
| VEHICLE ID | TEMPERATURE $Tb_n$ | TIME $t_n$ | POSITION $P_n$ | — $d_n$ |

| VEHICLE TYPE | BATTERY MODEL | MOUNTING POSITION | WEIGHT |
|---|---|---|---|
| SAME | - | - | 1 |
| DIFFERENCE | SAME | SAME | a |
| DIFFERENCE | SAME | DIFFERENCE | b |
| DIFFERENCE | DIFFERENCE | SAME | c |
| DIFFERENCE | DIFFERENCE | DIFFERENCE | d |

FIG. 11

| TEMPERATURE RANGE | INTEGRATED HOLDING TIME | RESISTANCE INCREASE COEFFICIENT | INTERNAL RESISTANCE |
|---|---|---|---|
| $\Delta T_1$ | $\tau_1$ | $\alpha_1$ | $R_1 = R_0 \times \alpha_1 \times \tau_1$ |
| $\Delta T_2$ | $\tau_2$ | $\alpha_2$ | $R_2 = R_1 \times \alpha_2 \times \tau_2$ |
| $\Delta T_3$ | $\tau_3$ | $\alpha_3$ | $R_3 = R_2 \times \alpha_3 \times \tau_3$ |
| ⋮ | ⋮ | ⋮ | ⋮ |
| $\Delta T_m$ | $\tau_m$ | $\alpha_m$ | $R_m = R_{m-1} \times \alpha_m \times \tau_m$ |

BATTERY SYSTEM AND ESTIMATION SYSTEM

INCORPORATION BY REFERENCE

The disclosure of Japanese Patent Application No. 2017-012057 filed on Jan. 26, 2017 including the specification, drawings and abstract is incorporated herein by reference in its entirety.

BACKGROUND

1. Technical Field

The present disclosure relates to a battery system and an estimation system, and more particularly, to a battery system configured to be mountable on a vehicle and an estimation system for estimating a deteriorated state of a secondary battery mounted on the vehicle.

2. Description of Related Art

Hybrid vehicles, electric vehicles, and the like equipped having a battery system including a secondary battery mounted thereon have been widely used. Since the secondary battery deteriorates with elapse of time or charging and discharging, it is desirable to take needed measures such as inspection or replacement of the secondary battery according to a deteriorated state (degree of progress of deterioration) of the secondary battery. Therefore, a technology for estimating the deteriorated state of the secondary battery with high accuracy is needed.

A temperature of the secondary battery (hereinafter also referred to as a "battery temperature") is known as a parameter having a great influence on deterioration of the secondary battery. Therefore, storing temperature history data including the battery temperature and estimating a deteriorated state of the secondary battery using the temperature history data have been proposed. For example, a battery cell control device disclosed in Japanese Unexamined Patent Application Publication No. 2012-185122 (JP 2012-185122 A) estimates a deteriorated state of a battery cell using history data including internal resistance of the battery cell, a state of charge (SOC), and temperature.

SUMMARY

When the temperature history data is used to estimate the deteriorated state of the secondary battery, an abnormal value may be contained in the battery temperature included in the temperature history data. An example of an estimation device (typically an electronic control unit (ECU)) that estimates the deteriorated state of the secondary battery includes a device that operates with electric power supplied from an auxiliary battery of a vehicle. However, since the life of a general auxiliary battery is about several years long, the auxiliary battery is temporarily detached from the vehicle at the time of replacement of the auxiliary battery. Further, the auxiliary battery may be detached from the vehicle, for example, even when the vehicle is repaired.

Thus, when electric power is not supplied from the auxiliary battery, the estimation device stops the operation. As a result, a loss may occur in the temperature history data. On the other hand, the deterioration of the secondary battery can progress even in a state in which the auxiliary battery is detached from the vehicle. Therefore, in a case where the likelihood of an abnormality (here, loss) of the temperature history data is not taken into consideration, the deterioration of the secondary battery progresses due to the influence of the battery temperature not appropriately reflected in the temperature history data, and the estimation accuracy of the deteriorated state of the secondary battery is likely to be low.

The present disclosure provides a technology capable of improving estimation accuracy of a deteriorated state of a secondary battery mounted on a vehicle in a case where an abnormality is contained in temperature history data in a battery system (or an estimation system) that estimates the deteriorated state of the secondary battery using the temperature history data.

A first aspect of the present disclosure relates to a battery system configured to be mounted on a vehicle. The battery system includes a secondary battery, a detection device, and an electronic control unit. The detection device is configured to detect a battery temperature that is a temperature of the secondary battery. The electronic control unit is configured to estimate a deteriorated state of the secondary battery using temperature history data including the battery temperature and a detection time of the battery temperature. The electronic control unit is configured to perform communication with an external device that accumulates temperature history data of another vehicle. The electronic control unit is configured to acquire, when the battery temperature of the temperature history data of the vehicle contains an abnormal value, the temperature history data of the other vehicle within a period in which the battery temperature of the temperature history data of the vehicle contains the abnormal value from the external device. The electronic control unit is configured to execute correction of the abnormal value of the battery temperature based on the temperature history data acquired from the external device.

In the battery system according to the first aspect of the present disclosure, the electronic control unit may be configured to execute at least one of supplementation of a missing value of the battery temperature contained in the temperature history data of the vehicle and substitution of an outlier of the battery temperature contained in the temperature history data of the vehicle, as the correction of the abnormal value.

According to the first aspect of the present disclosure, the electronic control unit is configured to execute correction (supplementation or substitution) of the abnormal value (more specifically, a missing value or an outlier) of the battery temperature based on the temperature history data of the other vehicle within the period in which the battery temperature of the temperature history data of the vehicle contains the abnormal value from the external device (for example, server) even when the abnormal value of the battery temperature is contained in the temperature history data of the vehicle. Accordingly, since the battery temperature within the period in which the abnormal value is contained is appropriately reflected in the temperature history data of the vehicle, the estimation accuracy of the deteriorated state of the secondary battery can be improved.

In the battery system according to the first aspect of the present disclosure, the electronic control unit may be configured to perform communication with the external device that accumulates temperature history data including the battery temperature, the detection time, and a detection position that is a position of the other vehicle when the battery temperature is detected from a plurality of the other vehicles which are parked, and the electronic control unit may be configured to acquire the temperature history data of the other vehicle within a period, from the external device based on the detection time and the detection position.

According to the first aspect of the present disclosure, the electronic control unit is configured to execute the correction of the abnormal value of the battery temperature based on the temperature history data collected in a server from the parked vehicles. Since the temperature history data includes the detection position of the battery temperature, it is possible to correct the abnormal value using the temperature history data collected from other vehicles having a relatively short distance to the vehicle (that is, vehicles having the same climate and weather conditions). Therefore, since the correction accuracy of the battery temperature is improved, it is possible to further improve the estimation accuracy of the deteriorated state of the secondary battery.

In the battery system according to the first aspect of the present disclosure, the electronic control unit may be configured to perform communication with the other vehicle located around the vehicle as the external device, and the electronic control unit may be configured to acquire temperature history data within the period, from the other vehicle.

According to the first aspect of the present disclosure, the electronic control unit is configured to execute correction of the abnormal value based on the temperature history data acquired through the communication between the vehicle and other vehicle located around the vehicle (so-called inter-vehicle communication). Generally, the communication distance of inter-vehicle communication is a short distance (for example, hundreds of meters). Therefore, the battery temperature from other vehicles having a relatively short distance to the vehicle is acquired. Such other vehicles are highly likely to have temperature history data (data in which part in which an abnormal value has been contained is normal) including the battery temperature that the vehicle should have detected. Therefore, since the correction accuracy of the battery temperature is improved by acquiring the temperature history data from the other vehicle in this manner, it is possible to further improve the estimation accuracy of the deteriorated state of the secondary battery.

In the battery system according to the first aspect of the present disclosure, the electronic control unit may be configured to calculate the amount of increase in internal resistance of the secondary battery using a time during which the battery temperature is held in each of a plurality of temperature ranges, the electronic control unit may be configured to calculate the amount of decrease in the internal resistance with a change in a state-of-charge (SOC) use region of the secondary battery, and the electronic control unit may be configured to estimate a deteriorated state of the secondary battery based on the internal resistance calculated from an initial value of the internal resistance, the amount of increase, and the amount of decrease.

The amount of increase of the internal resistance of the secondary battery is an index value indicating the deteriorated state of the secondary battery. According to the first aspect of the present disclosure, the amount of decrease in the internal resistance is also taken into account, in addition to the amount of increase in the internal resistance. Thus, the amount of change from an initial value of the internal resistance can be calculated with high accuracy. Therefore, it is possible to further improve the estimation accuracy of the deteriorated state of the secondary battery.

A second aspect of the present disclosure relates to an estimation system configured to estimate a deteriorated state of a secondary battery mounted on a vehicle. The estimation system includes an estimation device configured to estimate the deteriorated state of the secondary battery using temperature history data including a battery temperature that is a temperature of the secondary battery and a detection time of the battery temperature; a server configured to collect temperature history data of a plurality of vehicles other than the vehicle; and a communication device configured to perform communication between the estimation device and the server. The estimation device is configured to acquire, when the battery temperature of the temperature history data of the vehicle contains an abnormal value, temperature history data of the other vehicle within a period in which the battery temperature of the temperature history data of the vehicle contains the abnormal value, from the server via the communication device. The estimation device is configured to execute correction of the abnormal value based on the acquired temperature history data of the other vehicle.

According to the first and second aspects of the present disclosure, it is possible to improve estimation accuracy of a deteriorated state of a secondary battery mounted on a vehicle in a case where an abnormality is contained in temperature history data in a battery system (or an estimation system) that estimates the deteriorated state of the secondary battery using the temperature history data.

BRIEF DESCRIPTION OF THE DRAWINGS

Features, advantages, and technical and industrial significance of exemplary embodiments of the present disclosure will be described with reference to the accompanying drawings, in which like numerals denote like elements, and wherein:

FIG. 8 is a diagram illustrating an example of weighting of a record;

FIG. 11 is a diagram illustrating a process of S162 of the flowchart illustrated in FIG. 10 in more detail;

DETAILED DESCRIPTION OF EMBODIMENTS

Figure 1:
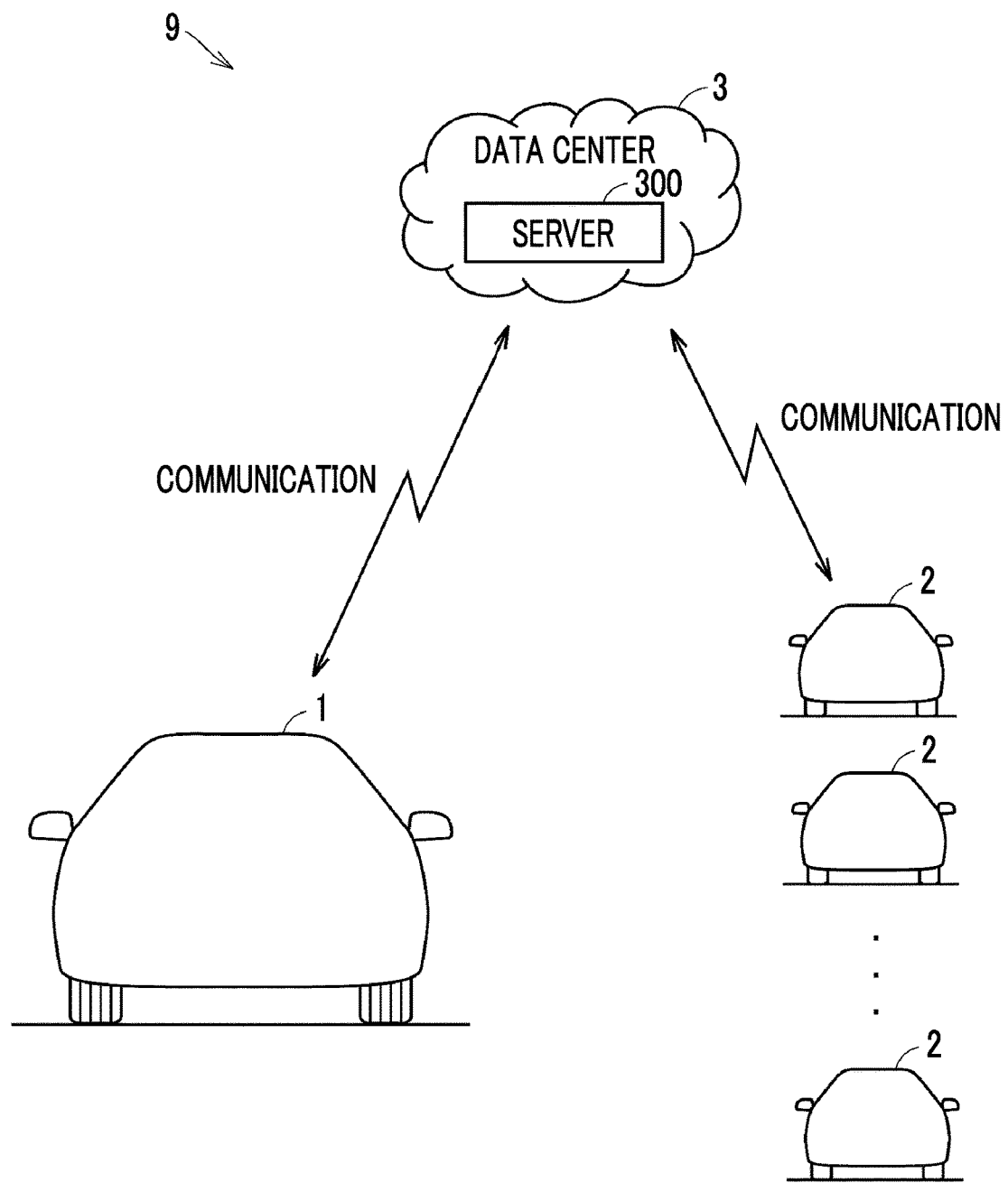
FIG. 1 is a diagram schematically illustrating an overall configuration of a battery system according to an embodiment.

Hereinafter, embodiments of the present disclosure will be described in detail with reference to the drawings. In the drawings, the same or corresponding parts are denoted by the same reference numerals, and description thereof will not be repeated.

Configuration of Battery System

FIG. 1 is a diagram schematically illustrating an overall configuration of a battery system according to an embodiment. A battery system 9 includes a vehicle of a user (so-called own vehicle) 1, a plurality of vehicles 2 (other vehicles) other than the vehicle 1, and a data center 3. Each of the vehicle 1 and the vehicles 2 is an electrically driven vehicle having a secondary battery 110 (see FIG. 2) mounted thereon and, more specifically, is a hybrid vehicle, an electric vehicle, or a fuel cell vehicle.

The data center (external device) 3 includes a server 300. The vehicle 1 and the server 300 are configured to be capable of bidirectional communication. Further, each of the vehicles 2 and the server 300 are also configured to be capable of bidirectional communication. Accordingly, the server 300 collects temperature history data D1, D2 to be described below from the vehicle 1 and the vehicles 2.

Figure 2:
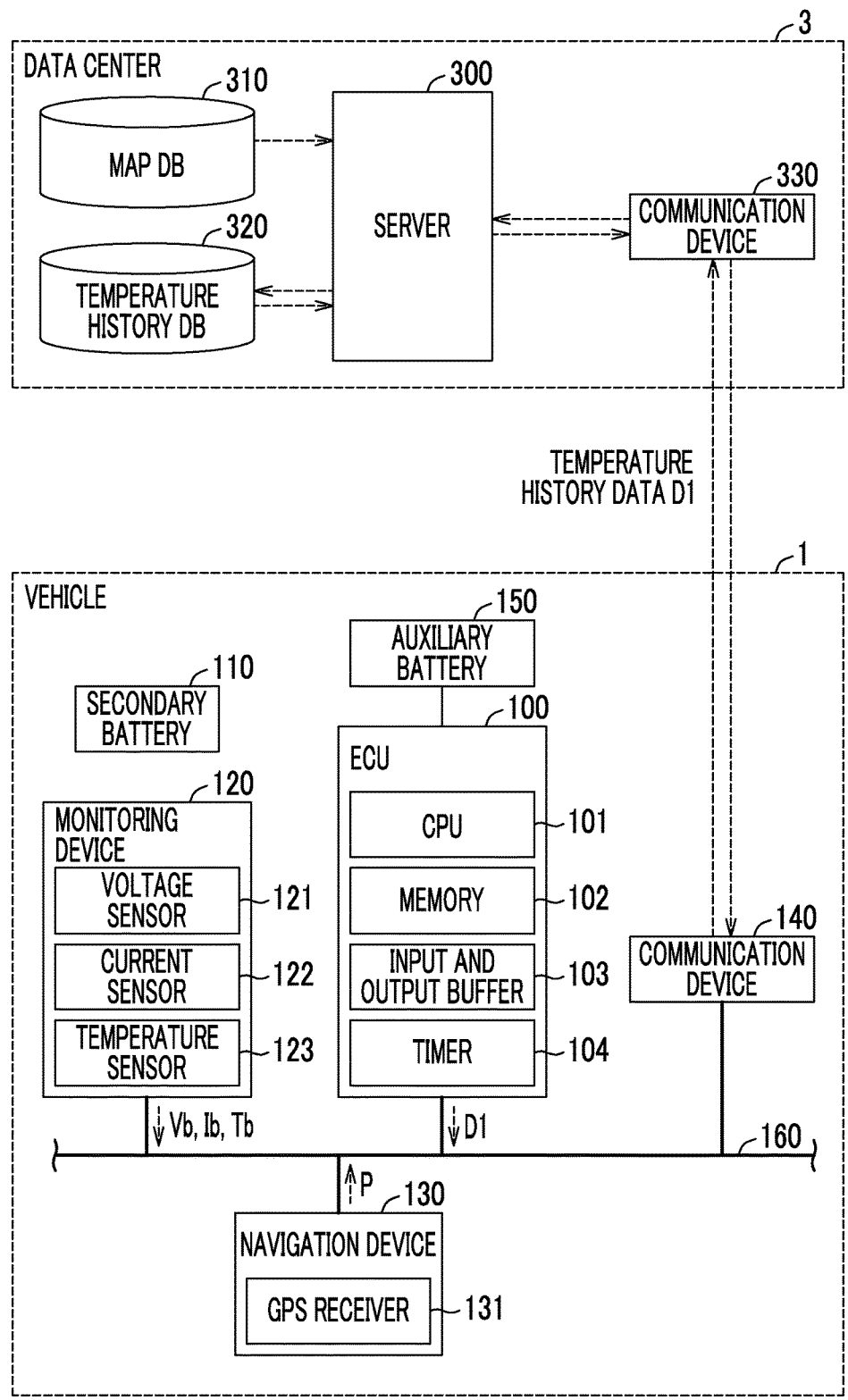
FIG. 2 is a diagram illustrating configurations of a vehicle and a data center illustrated in FIG. 1 in more detail.

FIG. 2 is a diagram illustrating configurations of the vehicle 1 and the data center 3 illustrated in FIG. 1 in more detail. Each of the vehicles 2 has a configuration common to the vehicle 1. Therefore, in order to prevent complication of the drawings, illustration of the vehicle 2 is omitted in FIG. 2.

The vehicle 1 includes an electronic control unit (ECU) 100, a secondary battery 110, a monitoring device 120, a navigation device 130, a communication device 140, and an auxiliary battery 150. The ECU 100, the monitoring device 120, the navigation device 130, and the communication device 140 are connected to each other by an in-vehicle local area network (LAN) 160.

The secondary battery 110 is a battery pack including a plurality of cells (not illustrated) of a lithium ion secondary battery, a nickel hydrogen battery, or the like. The secondary battery 110 supplies electric driving power to a motor generator (not illustrated) through an electric power control device. The motor generator can perform electric power generation through regenerative braking. Alternating current power generated by the motor generator is converted into direct current power by the electric power control device and the secondary battery 110 is charged with the direct current power.

The monitoring device 120 is provided to monitor a state of the secondary battery 110, and includes a voltage sensor 121, a current sensor 122, and a temperature sensor 123. The voltage sensor 121 detects a voltage Vb of the secondary battery 110. The current sensor 122 detects a current Ib that is input to and output from the secondary battery 110. The temperature sensor 123 is, for example, a thermistor, and detects a temperature Tb of the secondary battery 110. Detection results of the respective sensors are output to the ECU 100 via the in-vehicle LAN 160.

The temperature sensor 123 is an example of a "detection device" according to the aspect of the present disclosure. However, the detection device is not limited to the temperature sensor, and may be a sensor that enables the ECU 100 to estimate the temperature Tb. For example, the detection device may be an outside air temperature sensor, or may be a temperature sensor in a vehicle cabin (both not illustrated).

The navigation device 130 includes a global positioning system (GPS) receiver 131 for specifying a position of the vehicle 1 based on radio waves from an artificial satellite (not illustrated). The navigation device 130 executes various navigation processes for the vehicle 1 using the position P of the vehicle 1. More specifically, the navigation device 130 superimposes a current position of the vehicle 1 on a road map around the vehicle 1 based on the position P of the vehicle 1 and road map data stored in a memory (not illustrated), and displays a result thereof on a navigation screen (not illustrated). Further, the navigation device 130 guides a recommended route from the current position of the vehicle 1 to a destination. The position P of the vehicle 1 is also output to the ECU 100 via the in-vehicle LAN 160.

The communication device 140 is configured to enable the ECU 100 and the server 300 to perform bidirectional data communication. A communication scheme of the communication device 140 is not particularly limited, and may be, for example, a relatively low speed communication scheme, such as third generation mobile communication (so-called 3G). Further, for example, when the vehicle 1 enters a dealer or a maintenance factory, the ECU 100 and the server 300 may perform wired communication.

The ECU 100 includes a central processing unit (CPU) 101, a memory 102, an input and output buffer 103, and a timer 104. The ECU 100 controls each device so that the vehicle 1 enters a desired state. A main process executed by the ECU 100 includes a process of estimating the deteriorated state of the secondary battery 110. As will be described in detail below, the ECU 100 acquires the temperature Tb of the secondary battery 110 to generate the temperature history data D1 including the temperature Tb during parking of the vehicle 1 (preferably after a predetermined time elapses from start of parking). The temperature history data D1 is sequentially stored in the memory 102 for use in estimation of the deteriorated state of the secondary battery 110 and is appropriately transmitted to the server 300. The ECU 100 is an example of the "estimation device" according to the aspect of the present disclosure.

Figures 3, 4:
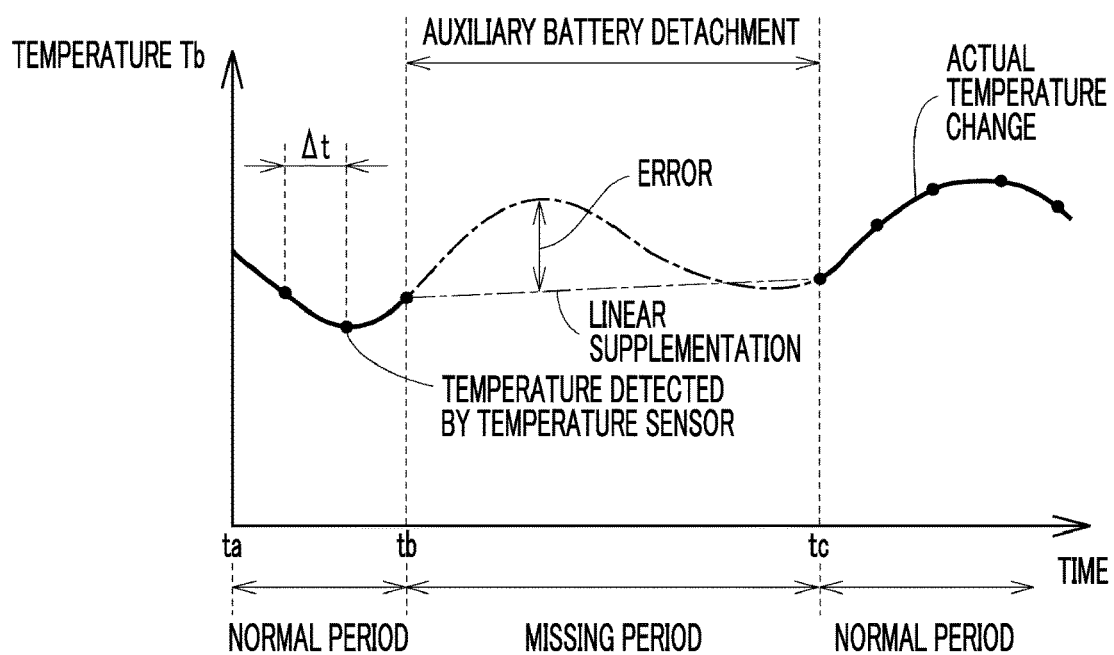
FIG. 3 is a diagram illustrating an example of a data format of temperature history data.
FIG. 4 is a diagram illustrating a loss of temperature history data.

FIG. 3 is a diagram illustrating an example of a data format of the temperature history data D1. As illustrated in FIG. 3, the temperature history data D1 includes a plurality of sequentially acquired records. The record acquired as the n-th (n is a natural number) record is indicated as "$d_n$". The record $d_n$ includes identification information of the vehicle 1, a temperature $Tb_n$ of the secondary battery 110 detected by the temperature sensor 123, time $t_n$ (so-called time stamp) at which the temperature $Tb_n$ has detected, and a position $P_n$ of the vehicle 1 when the temperature $Tb_n$ has been detected. Hereinafter, a suffix "n" is omitted and the temperature Tb, time t, the position P, or the like is also described in a case where an order of acquisition of each piece of information (parameters) is not particularly distinguished.

When the temperature history data D1 is stored in the memory 102 of the ECU 100, identification information of the vehicle 1 is not indispensable. When the temperature history data D1 is transmitted to the server 300, the identification information of the vehicle 1 may be added to other information. Further, the temperature history data D1 transmitted from the vehicle 1 to the server 300 has been described with reference to FIG. 3. However, the other vehicles 2 similarly generate temperature history data D2 and transmit the temperature history data D2 to the server 300. Since the temperature history data D2 transmitted from the vehicle 2 to the server 300 includes the same type of information as the temperature history data D1 transmitted from the vehicle 1 to the server 300, the description will not be repeated.

Referring back to FIG. 2, the data center 3 further includes a map database (so-called database server) 310, a temperature history database 320, and a communication device 330 in addition to the server (so-called application server) 300. The map database 310 stores, for example, road map data for the server 300 to execute a route search process in response to a request from the navigation device 130. The temperature history database 320 stores the temperature history data D1 from the vehicle 1 and the temperature history data D2 from the vehicles 2. The communication device 330 is configured to be capable of bidirectional data communication with the communication device 140 mounted on the vehicle 1.

The server 300 executes the route search process by referring to the map database 310 based on information on the position P and the destination of the vehicle 1 and transmits the obtained recommended route to the vehicle 1 using the communication device 330. Further, the server 300 stores the temperature history data D1, D2 received from the vehicle 1 and the vehicles 2 in the temperature history database 320 in a stratified manner for each vehicle ID.

Loss of Temperature History Data

In the battery system 9 configured as described above, an abnormal value is likely to be contained in the temperature Tb of the secondary battery 110 included in the temperature history data D1 of the vehicle 1. An example thereof may include a situation in which replacement of the auxiliary battery 150 is performed in a state in which the vehicle 1 is deposited in a maintenance factory or the like and the vehicle 1 is parked when the auxiliary battery 150 does not normally operate due to deterioration over time or the like. Alternatively, a situation in which the auxiliary battery 150 is temporarily detached from the vehicle 1 is also conceivable for repair of other parts of the vehicle 1. Under the above-described situation, no electric power is supplied from the auxiliary battery 150 to the ECU 100, and the ECU 100 stops the operation. As a result, a loss of the temperature history data D1 (more specifically, the record) is likely to occur.

FIG. 4 is a diagram illustrating a loss of the temperature history data D1. In FIG. 4, a horizontal axis indicates elapsed time and a vertical axis indicates the temperature Tb of the secondary battery 110. FIG. 4 illustrates a state in which the vehicle 1 is parked and the battery system of the vehicle 1 is stopped.

A period from time ta to time tb is a period in which the auxiliary battery 150 is connected to the vehicle 1. Hereinafter, the period is also referred to as a "normal period". The ECU 100 in the normal period is basically stopped, but the ECU 100 intermittently starts up each time a predetermined period Δt (for example, Δt=1 hour) elapses, and acquires the temperature Tb of the secondary battery 110 and the position P of the vehicle 1. A record d is generated by the temperature Tb, the position P, and time t when the temperature Tb and the position P have been acquired. The generated record d is stored in the memory 102 of the ECU 100 and transmitted to the server 300.

During the period from time tb to time tc, the auxiliary battery 150 is detached from the vehicle 1. Accordingly, since no electric power is supplied from the auxiliary battery 150 to the ECU 100, the ECU 100 cannot be started up even when it is a time at which the ECU 100 is to be started up. As a result, a loss of the record d occurs in the temperature history data D1. Hereinafter, the period is also referred to as a "missing period". The missing period is an example of "a period in which the battery temperature of the temperature history data of the vehicle contains the abnormal value" according to the aspect of the present disclosure.

The period after time tc is a normal period in which the replacement of the auxiliary battery 150 is ended and the auxiliary battery 150 is again connected to the vehicle 1. Therefore, it becomes possible to intermittently start up the ECU 100, and the generation of the record d and the transmission to the server 300 are performed.

In the above case, the ECU 100 can determine whether or not a loss of the record d has occurred in the temperature history data D1 based on time t included in the temperature history data D1. More specifically, in a period after time tc, the ECU 100 compares time $t_n$ of a record $d_n$ with time $t_{n+1}$ of a record $d_{n+1}$ that are consecutive for arbitrary n (all n). When an interval between time $t_n$ and time $t_{n+1}$ is a predetermined period Δt (when the interval is one hour in the above-described example), the ECU 100 can determine that the loss of the record does not occur between the record $d_n$ and the record $d_{n+1}$. On the other hand, when there is an interval longer than the predetermined period Δt between time $t_n$ and time $t_{n+1}$ (for example, when there is an interval of two hours or more), the ECU 100 can determine that the loss of record has occurred between the record $d_n$ and the record $d_{n+1}$.

The deterioration of the secondary battery 110 progresses even in a state in which the auxiliary battery 150 has been detached. Therefore, in a case in which the likelihood of the loss of the record d in the temperature history data D1 is not considered, the deterioration of the secondary battery 110 progresses due to the influence of the temperature Tb which is not appropriately reflected in the temperature history data D1, and the estimation accuracy of the deteriorated state of the secondary battery 110 is likely to be low.

As a measure for preventing degradation of the estimation accuracy of the deteriorated state, supplementing the temperature Tb in the missing period using the temperature Tb of the secondary battery 110 in the normal period before and after the missing period when the loss of the record d occurs in the temperature history data D1 is also conceivable. A scheme for supplementing data includes various schemes, but an example of linear supplementation is illustrated in FIG. 4.

When the missing period is a short period (for example, several hours), a change in the temperature Tb is relatively small, and therefore, the change in the temperature Tb is likely to be accurately supplemented even with the scheme using the temperature Tb in the normal period before and after the missing period. However, when the missing period continues for a certain period (for example, one day or more), the temperature Tb can change irregularly (see a dash-dotted line), such as the temperature Tb repeatedly increasing and decreasing with a change in outside temperature. It is difficult to supplement the change in the temperature Tb as described above by the above-described scheme, and an error is likely to occur between the supplemented temperature Tb and an actual temperature Tb.

Therefore, in the present embodiment, a configuration in which the temperature history data D2 in the missing period among the temperature history data D2 of the other vehicles 2 collected in the external server 300 is acquired is adopted. As described above, since the other vehicles 2 other than the vehicle 1 also transmit the temperature history data D2 to the server 300, the temperature history data D2 from the vehicles 2 is accumulated in the temperature history database 320. The temperature history data D1 of the vehicle 1 can be supplemented by acquiring an appropriate record d in the missing period from the temperature history data D2.

Figure 5:
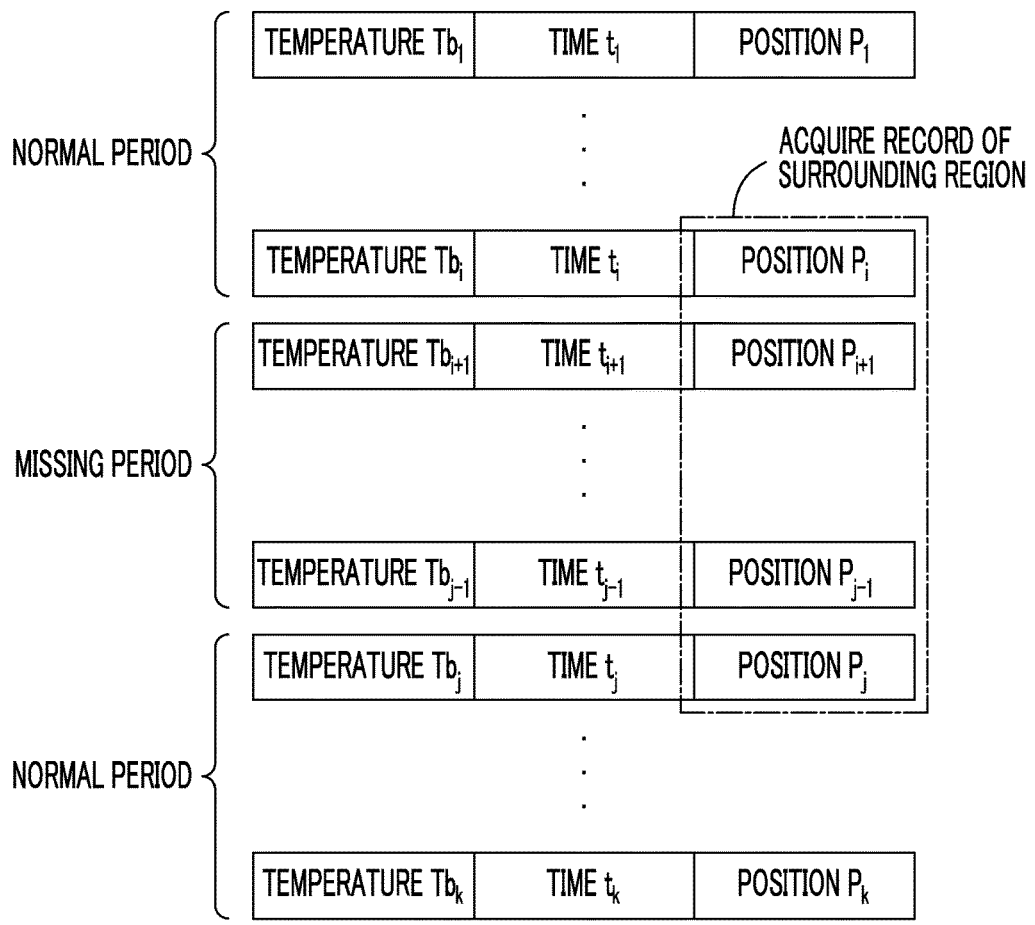
FIG. 5 is a diagram illustrating an example of a scheme of supplementing temperature history data.

FIG. 5 is a diagram illustrating an example of a scheme of supplementing the temperature history data D1. As described above, when there is an interval longer than the predetermined period Δt between time $t_i$ and time $t_j$, the ECU 100 determines that the loss of the record d has occurred. The ECU 100 acquires a needed number of records d in the period between time $t_i$ and time $t_j$ from the temperature history data D2 accumulated in the temperature history database 320. For example, when the missing period is about one day in the example in which one record d is added each time one hour elapses (example in which the predetermined period $\Delta t$=1 hour), the temperature history data D1 is supplemented by acquiring 24 records d.

When the record d to be acquired from the temperature history data D2 accumulated in the temperature history database 320 is selected, it is preferable to use position information of the vehicles 1, 2. This is because when a distance between the vehicle 1 and the vehicle 2 is relatively short, climate and weather conditions, for example, are highly likely to be the same, and the temperatures Tb of the secondary batteries 110 are highly likely to have similar values. Therefore, in the present embodiment, the record d collected from the vehicle 2 in a surrounding region (nearby region) of the position P of the vehicle 1 is selectively acquired and used for supplementation of the temperature history data D1 of the vehicle 1. When there is a plurality of such vehicles 2 in the surrounding region of the vehicle 1, an average value, a median, or the like of the temperatures Tb of the secondary batteries 110 of the vehicles 2 can be used as the temperature Tb of the secondary battery 110 of the vehicle 1.

The surrounding region can be defined by a distance from the position P of the vehicle 1, for example, as within a range of a radius of hundreds of m to several km around the vehicle 1. Alternatively, based on the road map data stored in the map database 310, the surrounding region may be defined by an administrative division, like within the same city or within the same town.

Thus, the vehicle 1 can supplement the temperature history data D1 in which the loss has occurred using the temperature history data D2 transmitted from the other vehicles 2 to the server 300 and accumulated in the temperature history database 320.

Although the configuration in which the temperature history data D1, D2 include the information on the temperature Tb, the position P, and time t has been described by way of example in FIGS. 3 and 5, the type of information included in the temperature history data D1, D2 is not limited thereto.

Figure 6:
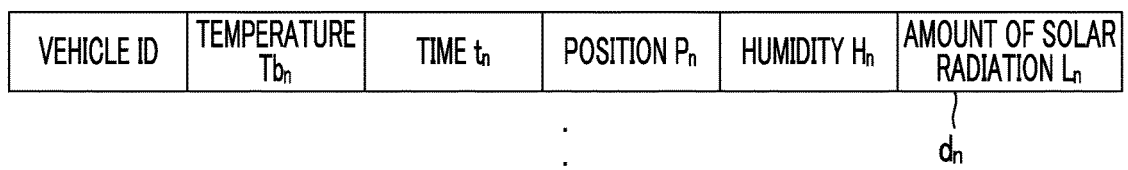
FIG. 6 is a diagram illustrating another example of the data format of the temperature history data.

FIG. 6 is a diagram illustrating another example of a data format of the temperature history data D1 (and D2). In addition to various pieces of information illustrated in FIGS. 3 and 5, the temperature history data D1 may further include information on humidity H around the vehicle 1 and the amount of solar radiation L to the vehicle 1.

For example, in a case where the secondary battery 110 is a lithium ion secondary battery, when the humidity around the secondary battery 110 becomes excessively high, inactivation of the negative electrode due to escape of lithium ions from a negative electrode is easily caused. Further, when the amount of solar radiation to the vehicle 1 increases, the temperature Tb of the secondary battery 110 easily increases, and deterioration of the secondary battery 110 easily progresses. Therefore, although not illustrated, it is more preferable to provide a humidity sensor and a solar radiation amount sensor in the vehicle 1 and acquire the humidity H and the solar radiation amount L in addition to the temperature Tb. By further considering the humidity H and the solar radiation L, it is possible to further improve the estimation accuracy of the deteriorated state of the secondary battery 110. One of the humidity H and the solar radiation L may be taken into consideration.

FIG. 7 is a diagram (histogram) illustrating an example of a supplementation result of the temperature history data D1. In FIG. 7, a horizontal axis indicates the temperature Tb of the secondary battery 110, and a vertical axis indicates a frequency of each temperature Tb.

Figure 7A:
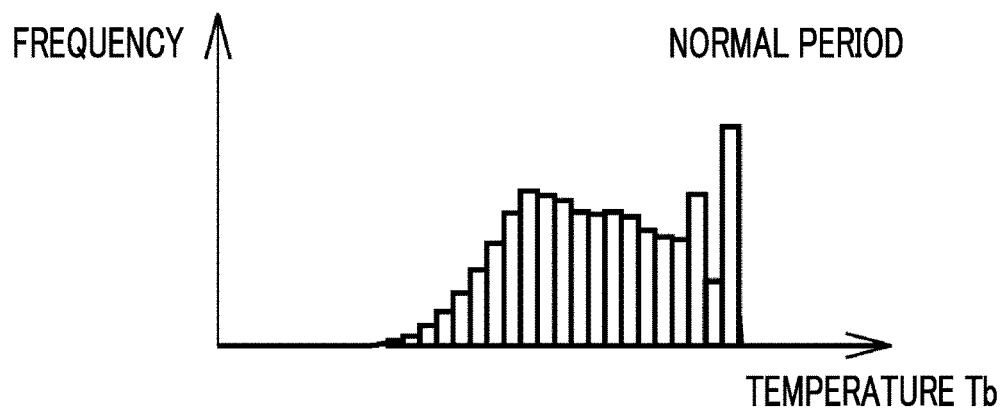
FIG. 7A is a diagram (histogram) illustrating an example of a result of supplementing a missing record.
Figure 7B:
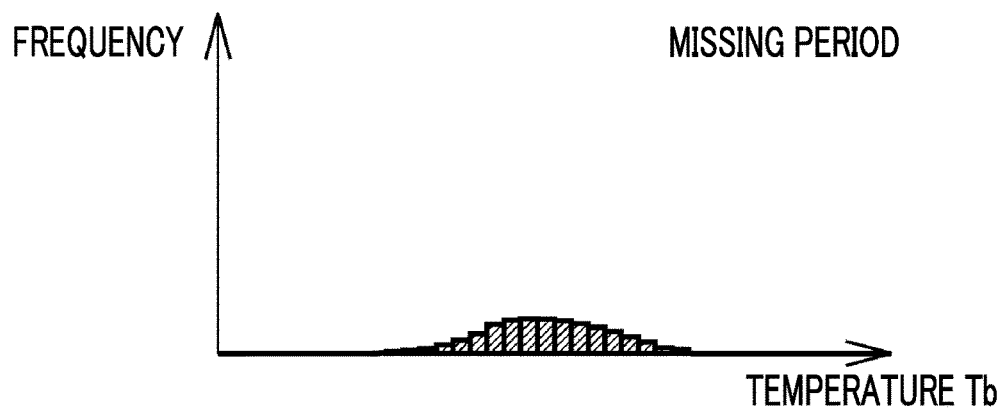
FIG. 7B is a diagram (histogram) illustrating an example of a result of supplementing a missing record.
Figure 7C:
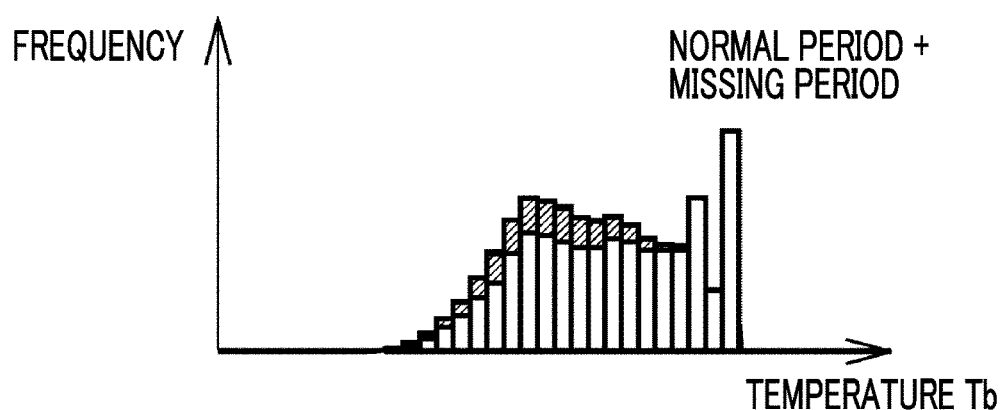
FIG. 7C is a diagram (histogram) illustrating an example of a result of supplementing a missing record.

FIG. 7A illustrates a distribution of the temperature Tb included in the record d normally acquired in the normal period and stored in the memory 102 of the ECU 100. FIG. 7B illustrates a distribution of the temperature Tb included in the record d acquired from the temperature history data D2 accumulated in the temperature history database 320. By combining the temperature distribution illustrated in FIG. 7A and the temperature distribution illustrated in FIG. 7B (adding the distribution at each temperature Tb), the temperature history data D1 can be supplemented even when a loss occurs in the temperature history data D1 due to the replacement of the auxiliary battery 150 or the like (see FIG. 7C).

When the record d for supplementing the temperature history data D1 in which the loss has occurred is acquired from the server 300, the records d collected from all the vehicles 2 may be equally handled, but it is preferable for weighting to be appropriately performed on the record d according to the configuration of the vehicle 2.

FIG. 8 is a diagram illustrating an example of the weighting of the record d. An example of an evaluation item for performing weighting on the record d may include whether the vehicle 1 and the vehicle 2 are of the same type, as illustrated in FIG. 8. In addition to the vehicle type, whether or not model numbers (configurations) of the secondary batteries 110 are the same when the vehicle 1 is compared with the vehicle 2 may be used as an evaluation item or whether or not the mounting positions on the vehicles of the secondary batteries 110 are the same may be used as an evaluation item.

The weighting can be performed based on identification information (vehicle ID) of the vehicles 1, 2 transmitted from the vehicles 1, 2 to the server 300. Information in which the identification information is associated with a car name, year, model, or the like of the vehicle is stored in a database (not illustrated) in advance. Accordingly, the server 300 can specify the car name, or the like of the vehicle 1 from the identification information of the vehicle 1. The same applies to the vehicle 2.

A weight can be indicated as a value within a range of zero to one, for example. As an example, the record d with a weight of one is handled equally to the record d acquired by the vehicle 1. On the other hand, the record d with a weight of zero is substantially not used.

FIG. 8 illustrates an example in which the weight in a case where the vehicle 1 and the vehicle 2 are of the same type is set to 1. As illustrated in FIG. 8, in a comparison between the vehicle 1 and the vehicle 2, the weight when the model numbers of the secondary batteries 110 are the same and the mounting positions of the secondary batteries 110 are also the same can be set to a ($0 \leq a \leq 1$). Further, the weight when the model numbers of the secondary batteries 110 are the same and the mounting positions of the secondary batteries 110 are different can be set to b ($0 \leq b < a$), and the weight when the model numbers of the secondary batteries 110 are different and the mounting positions of the secondary batteries 110 are the same can be set to c ($0 \leq c < a$). Further, the weight when both the model numbers and the mounting positions of the secondary batteries 110 are different can be set to d ($0 \leq d < b$ or $0 \leq d < c$).

Figure 9:
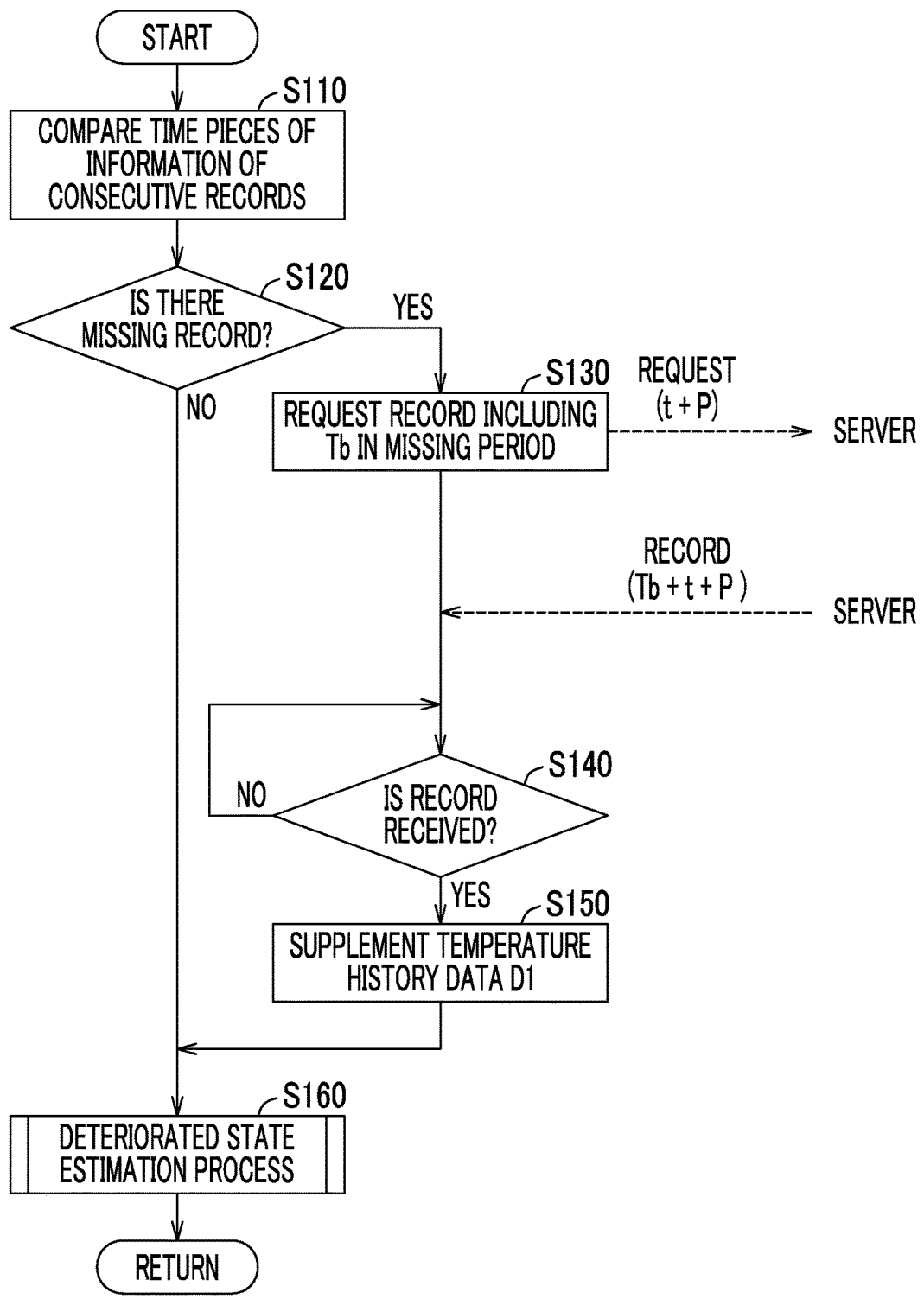
FIG. 9 is a flowchart illustrating a process of supplementing temperature history data in the embodiment.

FIG. 9 is a flowchart illustrating a process of supplementing the temperature history data D1 in the present embodiment. The process in the flowchart is called and executed from a main routine at the time of satisfying a predetermined condition or each time a predetermined time elapses. Each step (hereinafter abbreviated as "S") included in the flowchart is basically realized by software processing in the ECU 100. However, some or all of the steps may be realized by hardware (electrical circuit) produced in the ECU 100.

The ECU 100 executes the following process separately from the flowchart illustrated in FIG. 9. That is, each time the predetermined period Δt elapses, the ECU 100 acquires the temperature Tb of the secondary battery 110 from the temperature sensor 123 and acquires the position P of the vehicle 1 from the GPS receiver 131. Further, the ECU 100 generates the record d from the temperature Tb, the position P, and time t at which the temperature Tb and the position P are acquired, stores the record d in the memory 102 as the temperature history data D1, and transmits the record d to the server 300. The temperature history data D1 may be sequentially transmitted every predetermined period Δt or may be collectively transmitted at a predetermined timing (for example, at the time of entrance to a dealer). When the server 300 receives the temperature history data D1 from the vehicle 1, the server 300 stores the temperature history data D1 in the temperature history database 320. The same applies to the temperature history data D2 from the other vehicles 2.

Referring to FIG. 9, in S110, the ECU 100 compares times t of consecutive records d in the temperature history data D1 to determine whether the loss of the record d occurs in the temperature history data D1. Since the above-described determination scheme has been described in detail with reference to FIG. 4, description thereof will not be repeated.

In a case where the loss of the record d occurs in the temperature history data D1 (YES in S120), the ECU 100 proceeds to a process of S130 and requests the server 300 to transmit the record including the temperature Tb in the missing period. Along with the above request, the ECU 100 transmits, to the server 300, the identification information of the vehicle 1, the information (time information) on time t of the missing period, and the information (position information) on the position P of the vehicle 1 in the missing period.

When the server receives the request from the vehicle 1, the server 300 transmits the record d corresponding to the requested time information and the requested position information to the vehicle 1 that is a request source. More specifically, as described with reference to FIG. 5, the server 300 selects the record d collected from the vehicle 2 present in a surrounding region of the position P of the vehicle 1 during the missing period from the temperature history data D2 stored in the temperature history database 320, and transmits the selected record d to the vehicle 1. In this case, it is preferable for the server 300 to perform weighting as described with reference to FIG. 8 on the selected record d.

The ECU 100 waits until the ECU 100 receives the record d from the server 300 (NO in S140). When the ECU 100 receives the record d from the server 300 (YES in S140), the ECU 100 supplements the temperature history data D1 stored in the memory 102 by the received record d (S150).

In S160, the ECU 100 executes a "deteriorated state estimation process" of estimating the deteriorated state of the secondary battery 110 using the temperature history data D1. The above process will be described below in detail. When the loss of the record d does not occur in the temperature history data D1 in S120 (NO in S120), the ECU 100 skips the process of S130 to S150 and the process proceeds to S160.

As described above, according to the present embodiment, the temperature history data D1 of the vehicle 1 in which the loss has occurred is supplemented using the temperature history data D2 collected in the server 300 from the other vehicle 2. Since the time information and the position information are included in the temperature history data D1, D2, the temperature Tb acquired by the vehicle 2 present in the surrounding region of the vehicle 1 can be selectively acquired at a time when a loss occurs in the temperature history data D1. Therefore, it is possible to supplement the temperature Tb of the secondary battery 110 with high accuracy. As a result, it is possible to improve the estimation accuracy of the deteriorated state of the secondary battery 110 in the deteriorated state estimation process to be described below.

In the present embodiment, the configuration for acquiring the temperature history data D2 from the server 300 has been described by way of example, but an acquisition destination of the temperature history data D2 is not limited to the server 300. In a case where communication between the vehicle 1 and the other vehicle 2 (inter-vehicle communication) is possible, the vehicle 1 can acquire the needed temperature history data D2 through communication with the surrounding vehicle 2. Generally, a communication distance of the inter-vehicle communication is a short distance (for example, hundreds of meters). Therefore, by using the inter-vehicle communication, the temperature history data D2 is acquired from the vehicle 2 of which the distance to the vehicle 1 is relatively small. Therefore, since correction accuracy of the temperature Tb is improved, it is possible to further improve the estimation accuracy of the deteriorated state of the secondary battery 110.

Further, the case where the loss of the temperature history data D1 occurs has been described as a representative with reference to FIGS. 4 to 9, but a situation in which the abnormal value is contained in the temperature Tb included in the temperature history data D1 is not limited thereto. For example, the temperature Tb may be an outlier (a value greatly deviated from the distribution of the temperature Tb or a previous or subsequent temperature Tb) due to, for example, noise superimposed when the temperature Tb of the secondary battery 110 has been detected. Even in the case as described above, by similarly acquiring the temperature history data D2 collected in the server 300 from the other vehicle 2 (or by acquiring the temperature history data D2 through the inter-vehicle communication with the vehicle 2), the outlier of the temperature Tb can be substituted. Thus, at least one of the supplementation of the missing value of the temperature Tb and the substitution of the outlier of the temperature Tb is executed as the correction of the abnormal value of the temperature Tb.

Deteriorated State Estimation Process

Figure 10:
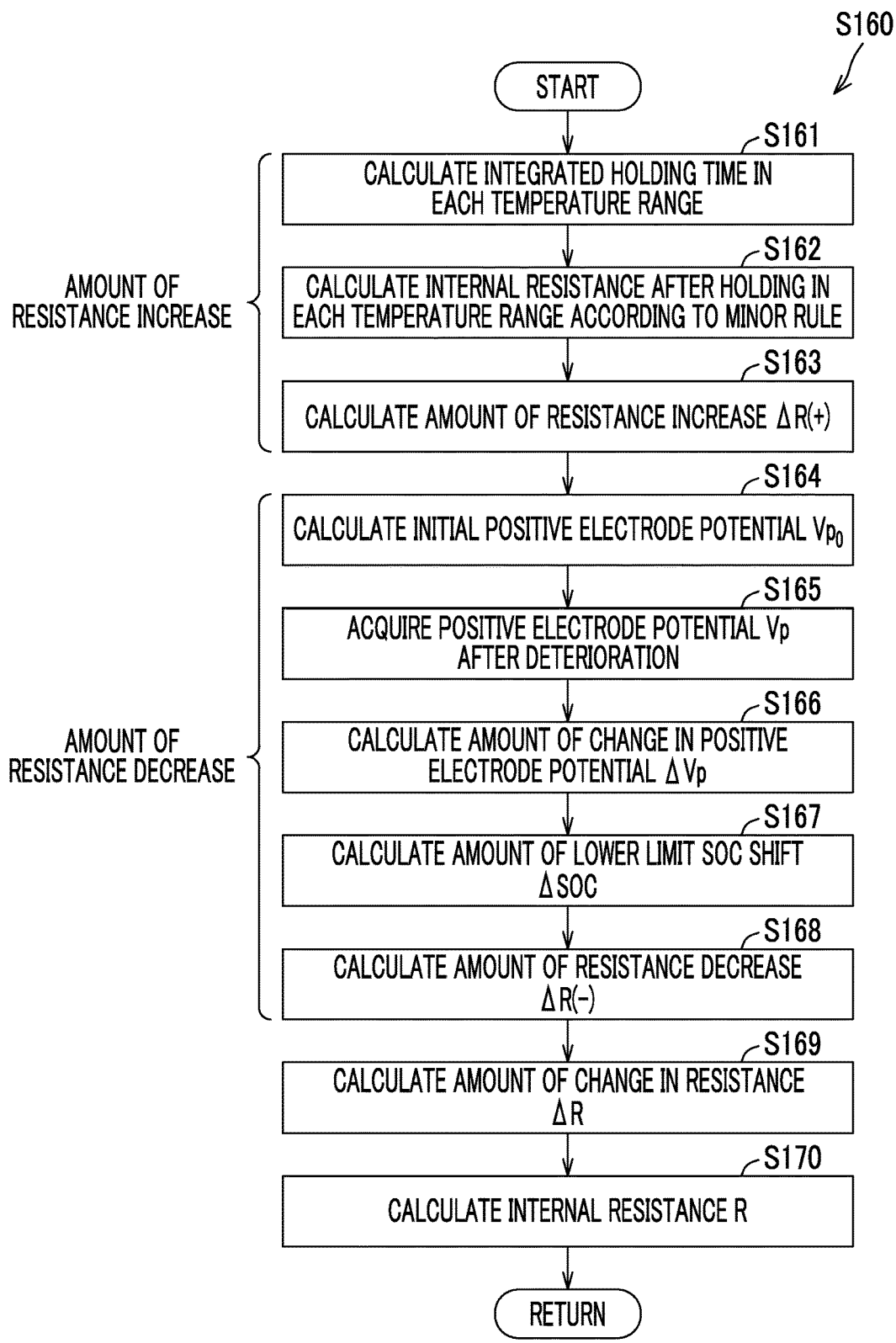
FIG. 10 is a flowchart illustrating a deteriorated state estimation process of a secondary battery according to the embodiment.

FIG. 10 is a flowchart illustrating the deteriorated state estimation process (see S160 of FIG. 9) of the secondary battery 110 according to the present embodiment. In the present embodiment, internal resistance R of the secondary battery 110 is used as an index value indicating the deteriorated state of the secondary battery 110. It is assumed that internal resistance (hereinafter also abbreviated as "initial resistance") $R_0$ in an initial state of the secondary battery 110 is acquired through prior measurement.

A process of S161 to S163 is a process of calculating the amount of increase in the internal resistance of the secondary battery 110 (hereinafter abbreviated as "amount of resistance increase") $\Delta R(+)$. In S161, the ECU 100 calculates the integrated holding time $t_m$ in each temperature range $\Delta T_m$ by integrating, for each temperature range $\Delta T_m$, how long the temperature Tb of the secondary battery 110 has been held in the temperature range $\Delta T_m$ (for example, a temperature range of about several ° C.) by referring to the temperature history data D1 stored in the memory 102.

According to a minor rule (linear cumulative damage rule), the internal resistance R of the secondary battery 110 after deterioration can be considered to be obtained by integrating the amount of resistance increase for each temperature condition to which the secondary battery 110 has been exposed, with the initial resistance $R_0$ of the secondary battery 110. Therefore, the ECU 100 calculates the internal resistance R ($R_m$) of the secondary battery 110 by sequentially adding the amount of resistance increase in an order of the first temperature range $\Delta T_1$ to the m-th temperature range $\Delta T_m$ (S162).

FIG. 11 is a diagram illustrating a process of S162 of the flowchart illustrated in FIG. 10 in more detail. In a case where the integrated holding time in the first temperature range $\Delta T_1$ is indicated as $\tau_1$ and a resistance increase coefficient in the first temperature range $\Delta T_1$ is indicated as $\alpha_1$, internal resistance $R_1$ of the secondary battery 110 held by $\tau_1$ in the first temperature range $\Delta T_1$ can be calculated by multiplying the initial resistance $R_0$ by the resistance increase coefficient $\alpha_1$ and the integrated holding time $\tau_1$ ($R_1 = R_0 \times \alpha_1 \times \tau_1$).

The resistance increase coefficient $\alpha_m$ is a parameter indicating the amount of resistance increase per unit time of the secondary battery 110, and can also be referred to as a deterioration rate. The resistance increase coefficient $\alpha_m$ is obtained as follows and stored in the memory 102 of the ECU 100. That is, a durability test is performed on the secondary battery 110 in each temperature range $\Delta T_m$, and the internal resistance before and after the durability test is performed is measured. The resistance increase coefficient $\alpha_m$ is calculated from the amount of increase in the internal resistance (amount of resistance increase) before and after the durability test is performed, and a time during which the durability test is performed.

Next, the internal resistance $R_2$ of the secondary battery 110 held by $\tau_2$ in the second temperature range $\Delta T_2$ can be calculated by multiplying the resistance increase coefficient $\alpha_2$ by the integrated holding time $\tau_2$ using the internal resistance $R_1$ due to holding in the first temperature range $\Delta T_1$ as an initial value ($R_2 = R_1 \times \alpha_2 \times \tau_2$). Although the description will not be repeated, the internal resistance $R_m$ of the secondary battery 110 can be calculated by performing the same process in the entire temperature range up to the m-th temperature range $\Delta T_m$ ($R_m = R_{m-1} \times \alpha_m \times \tau_m$).

Referring back to FIG. 10, in S163, the ECU 100 calculates the amount of resistance increase $\Delta R(+)$ by subtracting the initial resistance $R_0$ from the internal resistance $R_m$ calculated in S162.

In the subsequent process of S164 to S168, the amount of decrease in the internal resistance of the secondary battery 110 (hereinafter abbreviated as "amount of resistance decrease") $\Delta R(-)$ according to a change in an SOC use region is calculated. An order of the process of S161 to S163 and the process of S164 to S168 is not particularly limited, and the order of the processes may be exchanged. Hereinafter, the change in the SOC use region will be briefly described below.

Figure 12:
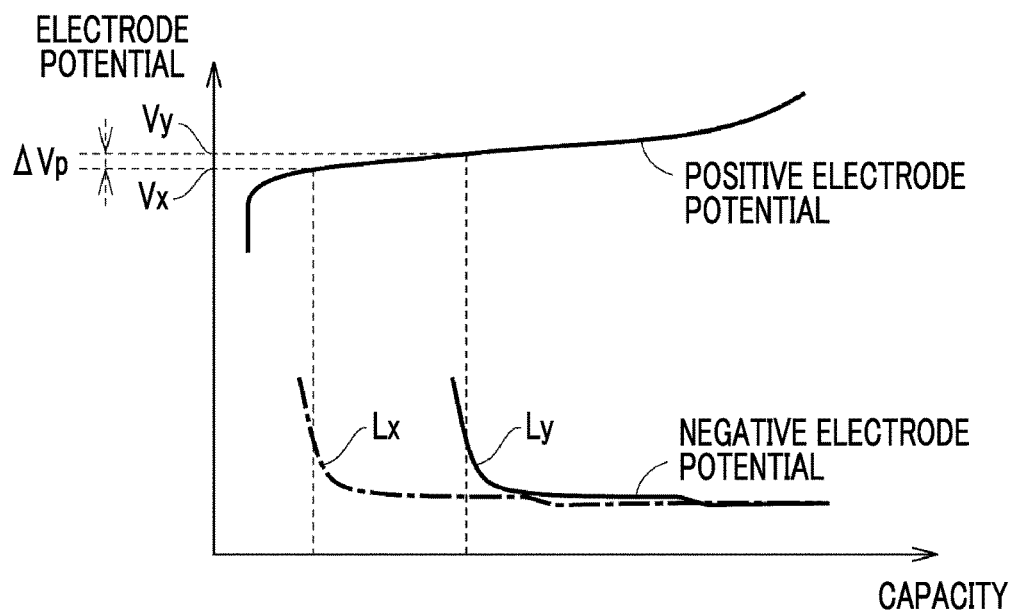
FIG. 12 is a diagram illustrating an example of a positive electrode potential curve and a negative electrode potential curve.

FIG. 12 is a diagram illustrating an example of a positive electrode potential curve and a negative electrode potential curve. In FIG. 12, a horizontal axis indicates a capacity of the secondary battery 110, and a vertical axis indicates an electrode potential (more specifically, an open circuit voltage (OCV)) of the secondary battery 110.

Generally, in a secondary battery, deterioration of a positive electrode and a negative electrode can separately progress with elapse of time or charging and discharging. For example, in a lithium ion secondary battery, lithium ions can be deposited on a surface of the negative electrode and inactivated. Further, a film can be formed on the surface of the negative electrode due to decomposition of an electrolytic solution. When the deterioration of the negative electrode progresses as described above, the negative electrode potential curve is shifted to the high capacity side from a curve Lx in an initial state to a curve Ly after deterioration. With the shift of the negative electrode potential curve, a lower limit potential of the positive electrode potential Vp increases from a voltage Vx in an initial state to a higher potential Vy. The foregoing means that the lower limit of the SOC (lower limit SOC) of the secondary battery 110 is shifted to a high SOC side.

Figure 13:
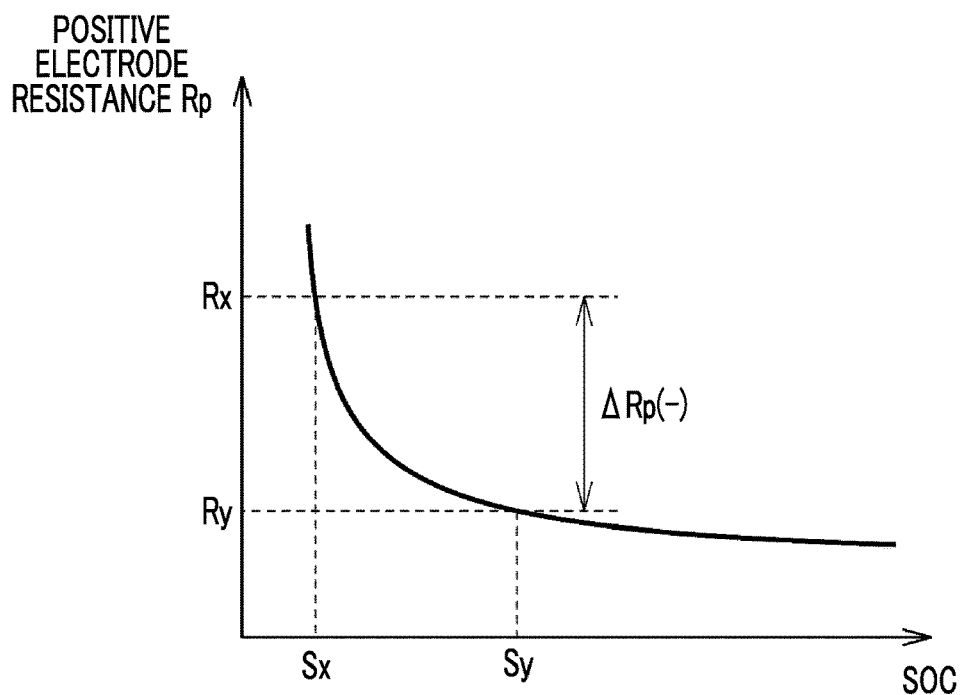
FIG. 13 is a diagram schematically illustrating a relationship between positive electrode resistance and an SOC.

FIG. 13 is a diagram schematically illustrating a relationship between positive electrode resistance Rp and the SOC. In FIG. 13, a horizontal axis indicates the SOC of the secondary battery 110 and a vertical axis indicates the positive electrode resistance Rp.

When the lower limit SOC of the secondary battery 110 is shifted to the high SOC side from Sx to Sy, the positive electrode resistance Rp decreases from Rx to Ry. On the other hand, even when the negative electrode potential curve is shifted to a high capacity side, the negative electrode resistance is often not greatly decreased. Therefore, in the present embodiment, a main factor of the decrease in the internal resistance R of the secondary battery 110 is assumed to be the positive electrode. The following calculation is performed assuming that the amount of resistance decrease $\Delta R(-)$ of the entire secondary battery 110 is equal to the amount of decrease in the positive electrode resistance Rp. In FIGS. 12 and 13, attention is focused on the change in the lower limit potential of the positive electrode potential Vp. However, use of the lower limit potential is not indispensable as long as the change in the positive electrode potential Vp with the shift of the negative electrode potential curve is obtained.

In S164, the ECU 100 calculates an initial potential $Vp_0$ of the positive electrode potential (initial positive electrode potential). More specifically, for example, a correspondence relationship between the temperature Tb and the SOC of the secondary battery 110 and the initial positive electrode potential $Vp_0$ is obtained by experiment in advance and stored in the memory 102 as a three-dimensional map (not illustrated). The ECU 100 acquires the temperature Tb of the secondary battery 110 and calculates the SOC of the secondary battery 110. The ECU 100 calculates the initial positive electrode potential $Vp_0$ from the temperature Tb and the SOC of the secondary battery 110 by referring to the three-dimensional map.

In S165, the ECU 100 acquires the positive electrode potential Vp of the secondary battery 110 after deterioration. For example, the positive electrode potential Vp1 may be acquired through simulation by constructing a battery model of the secondary battery 110, or may be acquired through measurement by introducing a reference electrode in some of cells (not illustrated) included in the secondary battery 110. Since the above-described scheme is well-known, detailed description thereof will not be repeated.

In S166, the ECU 100 calculates the amount of change in positive electrode potential $\Delta Vp$ by subtracting the initial positive electrode potential $Vp_0$ calculated in S164 from the positive electrode potential Vp acquired in S165 ($\Delta Vp = Vp - Vp_0$).

There is a correlation between the amount of change in positive electrode potential $\Delta Vp$ and the amount of lower limit SOC shift $\Delta SOC$ of the secondary battery 110. Typically, there is a primary correlation between the amount of change in positive electrode potential $\Delta Vp$ and the amount of lower limit SOC shift $\Delta SOC$. Therefore, the correlation can be obtained in advance and stored in the memory 102 of the ECU 100 in the form of a map or a function. The ECU 100 calculates the amount of lower limit SOC shift $\Delta SOC$ from the amount of change in positive electrode potential $\Delta Vp$ by referring to the correlation stored in the memory 102 (S167).

In S168, the ECU 100 calculates the amount of positive electrode resistance decrease $\Delta Rp(-)$ from the amount of lower limit SOC shift $\Delta SOC$. As described with reference to FIG. 13, when the lower limit SOC increases from Sx to Sy, the positive electrode resistance Rp decreases from Rx to Ry. By obtaining such a relationship for each temperature Tb in advance, it is possible to calculate the amount of positive electrode resistance decrease $\Delta Rp(-)$ from the temperature Tb and the amount of lower limit SOC shift $\Delta SOC$.

In S169, the ECU 100 calculates the amount of change in resistance $\Delta R$ by adding the amount of resistance increase $\Delta R(+)$ calculated in S163 to the amount of resistance decrease $\Delta R(-)$ calculated in S168 ($\Delta R=\Delta R(+)+R(-)$).

In S170, the ECU 100 calculates the internal resistance R from the initial resistance $R_0$ and the amount of change in resistance $\Delta R$ calculated in S169 ($R=R_0+\Delta R$).

Thus, according to the deteriorated state estimation process of the present embodiment, the amount of change in the internal resistance ($\Delta R$) is calculated in consideration of both the increase ($\Delta R(+)$) and the decrease ($\Delta R(-)$) of the internal resistance of the secondary battery 110. Accordingly, since the amount of change in the internal resistance can be calculated with high accuracy, it is possible to estimate the deteriorated state of the secondary battery 110 with high accuracy.

It should be considered that the embodiments disclosed this time are illustrative in all respects and are not restrictive. The scope of the present disclosure is shown by the claims rather than the description of the embodiments described above, and all modifications within the meaning and scope equivalent to the claims are intended to be included.

What is claimed is:

1. A battery system configured to be mounted on a vehicle, the battery system comprising:
   a secondary battery;
   a detection device configured to detect a battery temperature that is a temperature of the secondary battery; and
   an electronic control unit configured to estimate a deteriorated state of the secondary battery using temperature history data including the battery temperature and a detection time of the battery temperature, wherein
   the electronic control unit is configured to perform communication with an external device that accumulates temperature history data of another vehicle,
   the electronic control unit is configured to acquire, when the battery temperature of the temperature history data of the vehicle contains an abnormal value, the temperature history data of the other vehicle within a period in which the battery temperature of the temperature history data of the vehicle contains the abnormal value, from the external device, and
   the electronic control unit is configured to execute correction of the abnormal value of the battery temperature based on the temperature history data acquired from the external device.

2. The battery system according to claim 1, wherein the electronic control unit is configured to execute at least one of supplementation of a missing value of the battery temperature contained in the temperature history data of the vehicle and substitution of an outlier of the battery temperature contained in the temperature history data of the vehicle, as the correction of the abnormal value.

3. The battery system according to claim 1, wherein:
   the electronic control unit is configured to perform communication with the external device that accumulates temperature history data including the battery temperature, the detection time, and a detection position that is a position of the other vehicle when the battery temperature is detected from a plurality of the other vehicles which are parked; and
   the electronic control unit is configured to acquire the temperature history data of the other vehicle within the period, from the external device based on the detection time and the detection position.

4. The battery system according to claim 1, wherein:
   the electronic control unit is configured to perform communication with the other vehicle located around the vehicle as the external device; and
   the electronic control unit is configured to acquire temperature history data of the other vehicle within the period, from the other vehicle.

5. The battery system according to claim 1, wherein:
   the electronic control unit is configured to calculate an amount of increase in internal resistance of the secondary battery using a time during which the battery temperature is held in each of a plurality of temperature ranges;
   the electronic control unit is configured to calculate an amount of decrease in the internal resistance with a change in a state-of-charge use region of the secondary battery; and
   the electronic control unit is configured to estimate a deteriorated state of the secondary battery based on the internal resistance calculated from an initial value of the internal resistance, the amount of increase, and the amount of decrease.

6. An estimation system configured to estimate a deteriorated state of a secondary battery mounted on a vehicle, the estimation system comprising:
   an estimation device configured to estimate the deteriorated state of the secondary battery using temperature history data including a battery temperature that is a temperature of the secondary battery and a detection time of the battery temperature;
   a server configured to collect temperature history data of a plurality of vehicles other than the vehicle; and
   a communication device configured to perform communication between the estimation device and the server, wherein:
   the estimation device is configured to acquire, when the battery temperature of the temperature history data of the vehicle contains an abnormal value, temperature history data of the other vehicle within a period in which the battery temperature of the temperature history data of the vehicle contains the abnormal value, from the server via the communication device; and
   the estimation device is configured to execute correction of the abnormal value based on the acquired temperature history data of the other vehicle.

7. The battery system according to claim 1, wherein:
   the external device includes a server that collects temperature history data from a plurality of other vehicles which are parked, the temperature history data from the plurality of other vehicles each includes the battery temperature, the detection time, and a detection position that is a position of the other vehicle when the battery temperature is detected; and the electronic control unit is configured to acquire the temperature history data of the other vehicle within the period, from the external device based on the detection time and the detection position.

* * * * *